United States Patent [19]

Siegel

[11] Patent Number: 4,776,150
[45] Date of Patent: Oct. 11, 1988

[54] SEALING APPARATUS

[76] Inventor: Harold B. Siegel, 1963A Sherwood, Clearwater, Fla. 33575

[21] Appl. No.: 948,153

[22] Filed: Dec. 31, 1986

[51] Int. Cl.$^4$ .......................... B65B 7/28; B65B 51/14
[52] U.S. Cl. ........................................ 53/329; 53/373; 53/390
[58] Field of Search ................. 53/329, 373, 390, 559, 53/560, 477, 453; 156/87, 245, 285, 286, 538, 581, 583.1, 583.9

[56] References Cited

U.S. PATENT DOCUMENTS

| | | | |
|---|---|---|---|
| 2,155,445 | 4/1939 | Pittenger et al. | 53/560 |
| 3,378,991 | 4/1968 | Anderson | 53/390 |
| 4,506,495 | 3/1985 | Romagnoli | 53/559 |
| 4,510,014 | 4/1985 | Artusi et al. | 53/373 |
| 4,583,350 | 4/1986 | Artusi et al. | 53/373 |
| 4,612,755 | 9/1986 | Cavanagh | 53/390 |

FOREIGN PATENT DOCUMENTS 385718  3/1965  Switzerland .......................... 53/560

Primary Examiner—Horace M. Culver
Attorney, Agent, or Firm—Pettis & McDonald

[57] ABSTRACT

An apparatus for sealing medication blister cards including a unit dose of medication in at least one, if not all, of the blisters comprising card. More particularly, the apparatus includes a card holder for receiving the filled medication card and a heated sealing head movable into juxtaposition with the top surface of the filled card so as to apply both heat and pressure to the card as it is held between the card holder and the heated sealing head. First and second ridges extend upwardly from the card holder into engagement with the bottom of the medication blister card, and the contacting surface of the heated sealing head is knurled. Accordingly, as the card is held and heated between the card holder and the sealing head, the application of pressure and heat not only seals the card, but also the ridges and knurling effectively form channels whereby moisture present in the card is expelled therefrom and condenses on the card holder.

14 Claims, 3 Drawing Sheets

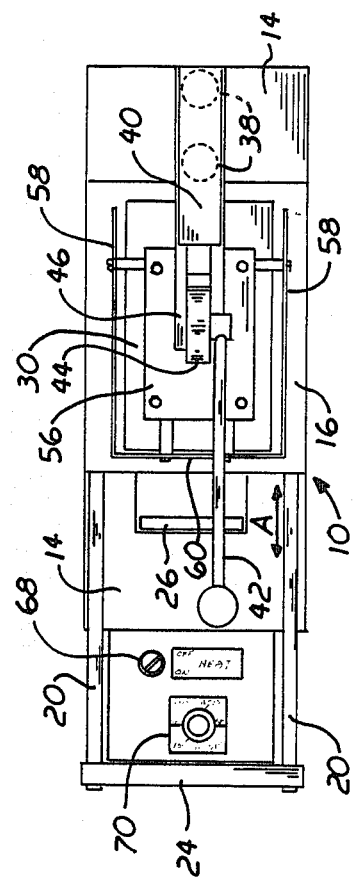
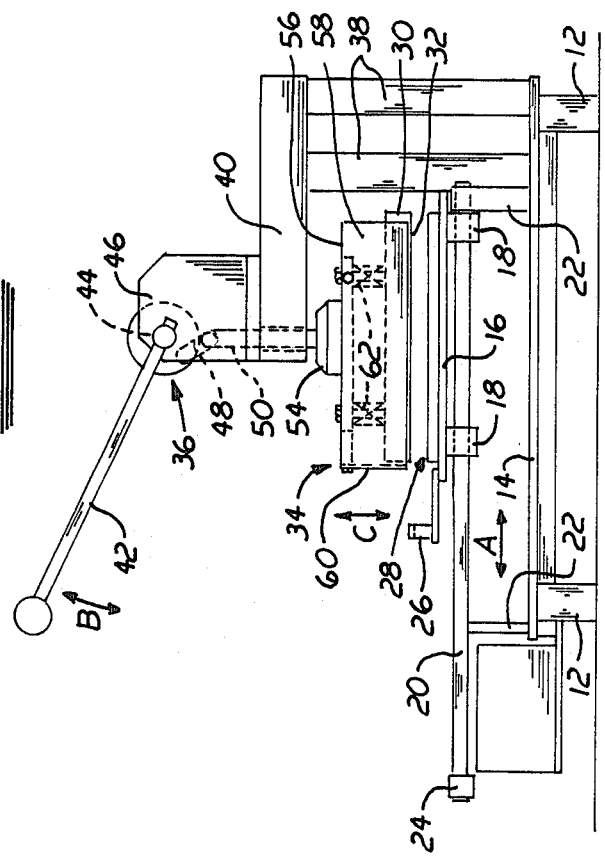
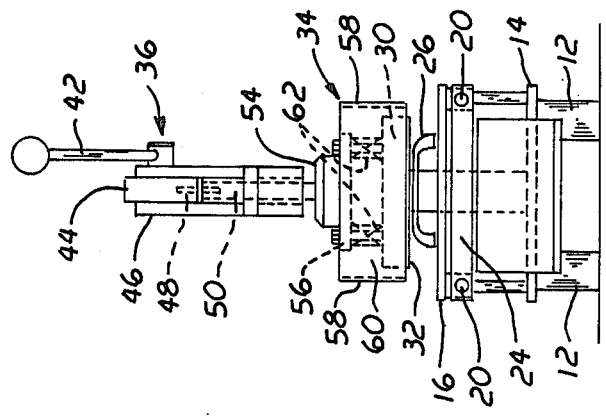

SEALING APPARATUS

BACKGROUND OF THE INVENTION

1. Field of the Invention

The present invention relates to an improved sealing apparatus for accomplishing heat sealing of a medication blister card including unit doses of medication in the blisters. The improved apparatus of this invention is characterized by its construction including a card holder which receives the filled medication card and a heated sealing head which is movable into juxtaposition with the exposed top surface of the medication blister card to sandwich the card between the sealing head and the card holder while applying both heat and pressure thereto to accomplish the sealing operation. The card holder comprises a plurality of first ridges formed substantially around the perimeter thereof and a plurality of second ridges formed thereon around the perimeter of each blister of the medication card. The sealing head comprises a knurled surface which actually contacts the exposed top surface of the filled medication card during the sealing operation. Thus, during the sealing operation, the medication blister card is "sandwiched" between the card holder and the heated sealing head. The first and second ridges formed on the card holder extend upwardly from the surface of the card holder and, during the sealing operation, effectively define channels whereby moisture driven from the card as the result of application of pressure and heat from the sealing head may condense on the main surface of the card holder. This condensation is significant for at least two reasons. First, because the moisture condenses on the card holder, the moisture may be said to be driven away from the medication blister card. Obviously, one would not wish moisture to collect within the individual blisters, for that could easily result in deterioration of the medication contained therein. Second, the condensation effectively cools the card holder during extended periods of operation of the apparatus. This cooling effect is significant for the reason that the blisters of the medication blister card are almost without exception formed from a plastic material. Should the card holder become excessively hot, that heat could have an adverse effect not only upon the blisters, but also upon medication contained therein. It should also be noted that the provision of first and second ridges as well as construction of the contact surface of the sealing head to include knurling also enhance the physical integrity of the overall seal of the card.

2. Description of the Prior Art

Within the medical service profession, it often occurs that a particular patient is to receive a unit dose of medication at regularly occurring intervals such as, for example, once a day. Both the purposes of insuring that medication is properly administered and taken, as well as for maintaining effective cost control, it is quite common to administer such regularly repeating doses of medication by packaging the medication in medication blister cards containing individually sealed doses. Such cards are frequently referred to within the profession as "bingo cards."

Just as the use of such medication blister cards for packaging unit does of solid or substantially solid medication is quite common, so are inherent difficulties associated with the preparation of such cards. A first problem encountered within the profession concerns efficient means for placing the medication within the individual blisters, and a variety of devices and means are available for that purpose. A second problem concerns the actual sealing of the filled cards. The main components of standard medication blister cards are top and bottom sheets of cardboard hinged together as by a fold. Both of the cardboard substrates include apertures formed therethrough corresponding to the individual blisters. One of the cardboard substrates generally includes an aluminum foil placed on the interior surface thereof in closing relation to the blister apertures. The other cardboard substrate normally includes a blister sheet formed from plastic and defining a plurality of blisters corresponding to the apertures placed thereon. Thus, when the individual apertures are filled while the card is open, the card may then be folded onto itself so that the foil-cardboard sheet closes the blister-cardboard sheet. The card is then sealed by the application of pressure and heat. It is with particular regard to this sealing operation that difficulties may arise.

First, because medication is contained in the card, it is extremel important that the physical integrity of the sealed card be maintained. Second, because the cards primarily comprise cardboard stock, it is well known that the empty cards will absorb significant quantities of moisture during transportation and storage. Since the sealing operation, almost without exception, is accomplished by pressure and heat, moisture is driven from the card. In many instances this mean that moisture actually condenses on the inside of the individual plastic blisters. This is quite obviously not desirable, for moisture will rapidly deteriorate many forms of medication. Furthermore, because the sealing process generally involves the application of heat at temperatures of 400° F. or higher, care must be taken to insure that this heat is not transferred to the plastic blisters or to medication contained within the blisters. Transfer of heat to medication is particularly troublesome when the medication is of a gelatinous form.

Of course, heat seals, per se, are quite old and well known. It is therefore not surprising that numerous means are taught in the prior art for accomplishing such heat seals. For example, U.S. Pat. No 2,768,272 to Lesher teaches that a heat source having a knurled contact surface is useful for heat sealing thermoplastic material. Another thermoplastic welding or sealing device is disclosed in U.S. Pat. No. 2,963,072 to Swartz. That patent teaches the application of sealing heat through what might accurately be described as a tongue and groove holder for the materials being bonded together. A somewhat similar land and groove apparatus is disclosed in U.S. Pat. No. 4,001,075 to Menzner. Though not strictly a sealing apparatus, U.S. Pat. No. 4,243,470 to Higashiguchi teaches a device for applying heat transfers. A fixed base plate is provided and the material onto which the heat transfer is to be applied as well as the heat transfer itself are held between that base plate and a movable heat plate. According to the teaching of this patent, more efficient transfer takes place when either the base plate of the heat plate comprises a plurality of holding means defined by needles extending toward the material onto which the transfer is to be placed. It is quite apparent that the utilization of such needles would be totally inappropriate with regard to the sealing of medication cards, for the needles would destroy the physical integrity of the individual blisters of the card. Finally, U.S. Pat. No. 4,398,883 to Vetter, et al. discloses a packaging machine wherein the contacting surface of the heating plate includes a plurality of raised zones surrounded by interconnected retracted zones to prevent the inclusion of any residual air between the thermoplastic packaging foil and the contacting surface of the heating plate.

Thus, while it certainly cannot be denied that the prior art teaches a variety of devices which might be used for sealing medication blister cards, there is no teaching nor suggestion in the prior art of a sealing apparatus including means for channeling absorbed moisture from the card and away from the medication blisters, and also including means for reducing the likelihood of heat damage to the plastic blisters or medication contained therein. It is therefore clear that there is a great need in the art for a simple, yet efficient and economical, means for sealing medication blister cards while at the same time substantially reducing, if not eliminating, adverse affects to the card and its medication relating to moisture condensation and heat build-up. Furthermore, it would also be desirable if such an apparatus could easily be utilized for sealing medication blister cards of a variety of sizes and configurations.

SUMMARY OF THE INVENTION

The present invention relates to an improved sealing apparatus of the type primarily intended for use in sealing medication blister cards including a unit dose of medication in individual ones of the blisters. In this regard it is to be noted that the medication blister cards normally comprise a pair of main cardboard substrates having apertures formed therethrough corresponding to the individual medication blisters, with the cardboard substrates being joined to each other as by a fold. The apertures formed through one of the cardboard substrates are sealed by the provision of a metallic foil material thereacross. The apertures in the other cardboard substrate receive a blister sheet therein, and other means are utilized for filling the blisters with appropriate medication. Once filled, the cardboard substrate having the metallic foil thereon is folded onto the cardboard substrate having the medication-containing plastic blisters therein, and the card is then ready for sealing. Sealing is accomplished by the application of pressure and heat to the filled, folded card, so it is to be noted that a variety of dissimilar materials must be sealed. Of course, it is also to be remembered that in the heat sealing process care must taken so that excessive heat neither damages the plastic blisters nor the medication contained therein. Furthermore, because it is known that such cardboard substrates absorb relatively large quantities of moisture (as much as 12-18%, by weight) from the atmosphere, care must also be taken to prevent the condensation of moisture within the medication-containing blisters. Accordingly, and as is set forth in greater detail hereinafter, the improved sealing apparatus of this invention is of a construction which not only substantially reduces the possibility of heat damage, but also channels moisture driven from the card during the heat sealing operation away from the blisters.

The sealing apparatus of this invention basically comprises a support frame having card carriage means movably mounted thereon. A card holder means is removably attachable to the carriage means, and the card holder means is dimensioned and configured to receive a filled medication blister card thereon for sealing. By virtue of the particular construction of the card holder means of this invention, it is easily adapted to receive medication blister cards of different sizes thereon while still insuring proper placement of the card throughout the sealing operation.

The sealing apparatus further comprises a sealing head movably mounted on the support frame, means for heating the sealing head operatively connected thereto, and operating means mounted on the support frame and operatively connected to the sealing head means whereby the sealing head may be disposed in juxtaposition to the medication blister card for the application of pressure and heat thereto for sealing the card.

The card holder means comprises a plurality of apertures formed therethrough, each of the apertures being dimensioned to receive a blister of the filled medication blister card therein. In order to permit use of the card holder means with a variety of different medication blister cards as indicated above, the card holder means further comprises a pair of slug apertures formed therethrough and a corresponding pair of card plugs removably insertable therein. Each of the slugs has a blister aperture formed therethrough, and each of the blister apertures corresponds to the dimension and configuration of the medication blister of an individual medication blister card. Thus, by selecting the appropriate card slugs, the card holder means may be utilized to hold and position a particular medication blister card in proper relationship to the sealing head means of this apparatus.

The filled medication blister card is placed on a first surface of the cardholder means, and that first surface comprises a plurality of first ridges extending away therefrom as well as a plurality of second ridges also extending away therefrom. While both the first and second ridges extend from said first surface in substantially perpendicular relation thereto, the height of the first ridges is greater than the height of the second ridges. Furthermore, the first ridges are formed around the perimeter of the first surface of the card holder means while the second ridges are formed around the perimeter of each aperture formed through the card holder means. Accordingly, the medication blister card is somewhat spaced apart from the card holder means first surface for purposes described hereinafter.

The sealing head means of this invention is movable between a first, retracted position and a second, engaged position with respect to an exposed surface of the medication blister card held by the card holder means when the card carriage means is moved to align the card with the sealing head. The sealing head further comprises a knurled surface formed thereon whereby that knurled surface will contact the medication blister card when the operating means is actuated to position the sealing head means and its second, engaged position. It is also to be understood that the apparatus of this invention further comprises means for heating the sealing head as well as control means mounted on the support frame and operatively connected to the heating means whereby the operation of the heating means may be regulated. In the preferred embodiment set forth hereinafter, it will be seen that the heating means is an electric heater and the control means comprises a thermostat. The knurled surface of the sealing head means is defined by a plurality of grooves, each one of said grooves intersecting at least another one of the grooves. In cross-section, each of the grooves is substantially V-shaped, and the sides of each groove define an angle of about 120'-170°, with an angle of about 150° being preferred. It has also been found to be advantageous to construct the sealing head means to further comprise a floating mount disposed in interconnecting relation between the knurled surface and the operating means whereby the knurled surface will conform accurately to the plane of the medication blister card when the operating means is actuated to place the sealing head means in its second, engaged position.

In operation, the control means is energized and the thermostat set to the desired temperature, with that temperature being determined pursuant to specifications of the particular medication blister card. Once the sealing head means is properly heated, the filled medication blister card is placed onto the card holder means and the carriage means is utilized to place the medication blister card in proper sealing relationship to the sealing head means. The operating means is then actuated to press the heated sealing head means into contact with the exposed surface of the medication blister card so that the card is effectively "sandwiched" between the knurled surface of the sealing head means and the first and second ridges of the card holder means. Normally, pressures in excess of one ton per square inch are applied, and a sealing head means temperature of about 400° F. is maintained. Dependent upon the characteristics of the medication blister card, sealing is accomplished in a time of no more than about eight seconds. Because of the application of heat and pressure to the card during this sealing procedure, moisuture contained within the card will be driven therefrom. The second ridges serve to block the passage of moisture into the medication-containing blisters, and both the first and second ridges define channels between the first surface of the card holder means and the medication blister card so that moisture driven from the card will condense onto the card holder's first surface. Of course, the knurled surface of the sealing head means also permits the escape of water vapor from the top of the medication blister card. Because moisture driven from the card condenses onto the first surface of the card holder means, a significant cooling effect is also provided by the construction of the sealing apparatus of this invention. Over long periods of use, there would be significant heat build-up on the card holder means but for the cooling effect of moisture condensation and subsequent evaporation of the moisture. This cooling effect is important for the purpose of protecting and preserving the integrity of the plastic blisters of the filled car and also to reduce heat transfer to medication contained within the blisters. As already indicated above, this cooling effect is particularly important when gelatinous medications are being sealed, for excessive heat might actually liquify portions of the medication.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a front elevational view of the improved sealing apparatus of this invention.

FIG. 2 is a right side elevational view of the apparatus as shown in the view of FIG. 1.

FIG. 3 is a top plan view of the apparatus as shown in FIG. 1.

Similar reference characters refer to similar parts throughout the several views of the drawings.

DETAILED DESCRIPTION

Figure 4:
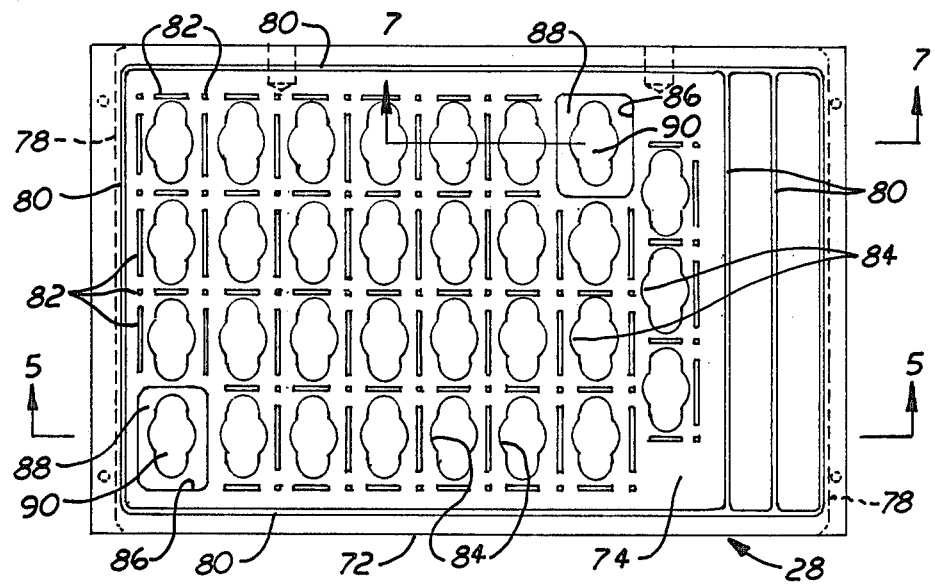
FIG. 4 is a top plan view of the card holder means.

The improved sealing apparatus of this invention is generally indicated as 10 in the views of FIGS. 1-3. Referring first to the view of FIG. 2, it can be seen that apparatus 10 comprises a support frame including legs 12 and support base 14. A carriage means defined by carriage frame 16 is movably mounted on the support frame by carriage slides 18 through which are received horizontal carriage rods 20, with rods 20 being held in place by carriage legs 22. A carriage rod support bar 24 is provided in interconnecting relation between the forward ends of rods 20 as best seen in the view of FIG. 3. Finally, a carriage handle 26 is attached to the forward end of carriage frame 16 whereby carriage frame 16 may be moved along carriage slides 18 as indicated by directional arrows A.

Figure 5:
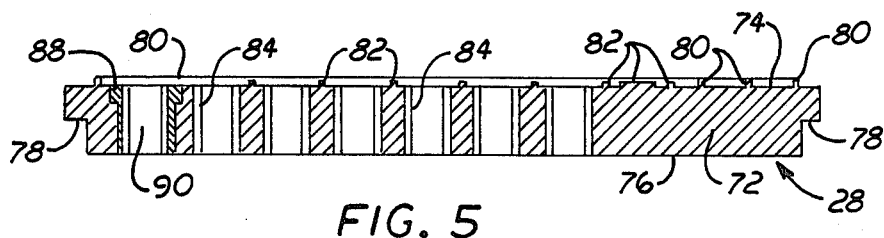
FIG. 5 is a sectional view taken along line 5—5 of FIG. 4.

A card holder means generally indicated as 28 in the views of FIGS. 4 and 5 is removably attachable to carriage frame 16. Structural details of the card holder means 28 are presented hereinafter.

Figure 6:
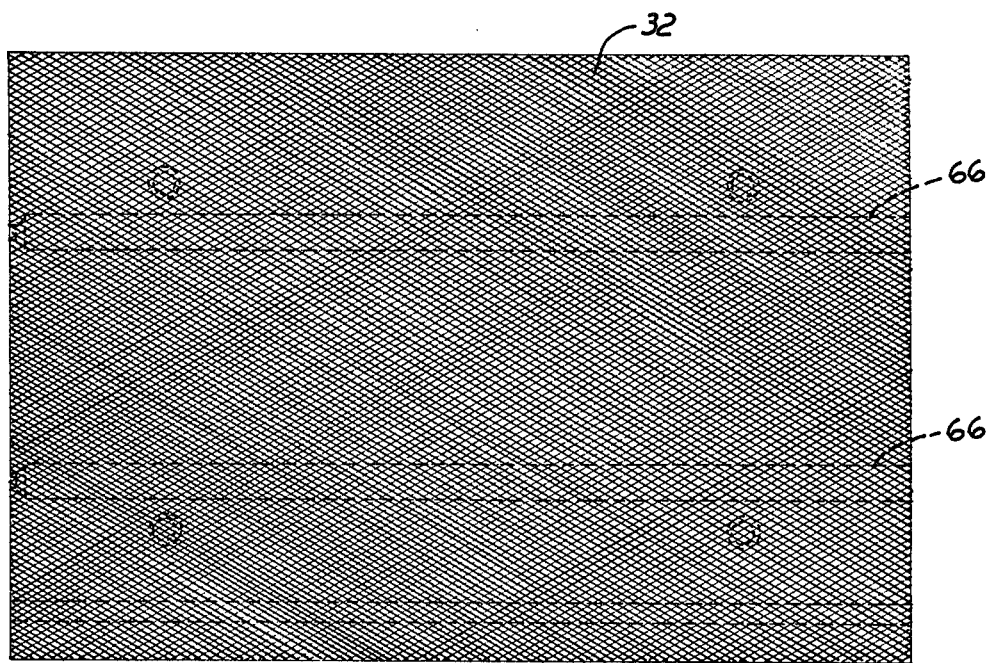
FIG. 6 is a plan view of the knurled surface of the sealing head means.

The improved sealing apparatus 10 further comprises sealing head means movably mounted on the support frame. As perhaps best seen in the views of FIGS. 1-3, the sealing head means comprises a sealing head plate 30, the exposed surface 32 thereof being knurled as shown in the view of FIG. 6. The sealing head means further comprises a floating mount generally indicated as 34, and floating mount 34 is disposed in interconnecting relation between sealing head plate 30 and operating mans generally indicated as 36. Operating means 36 is mounted on the support frame by operating support legs 38 and horizontal support bar 40. Operating means 36 further comprises a lever 42 one end of which is connected to operating rod 44. Rod 44 is mounted within operating bracket 46 so that rod 44 may turn about its axis. A link 48 extends from rod 44 to one end of piston arm 50. As seen in the view of FIG. 2, piston arm 50 passes downwardly through piston aperture 52 formed through horizontal support bar 40, and piston arm 50 terminates in a piston head 54 which is fixedly attached to top plate 56 of the floating mount 34. Accordingly, movement of lever 42 as indicated by directional arrows B in the view of FIG. 2 will result in corresponding up and down movement of the sealing head means as indicated by directional arrows C.

Inasmuch as sealing head plate 30 is heated, floating mount 34 further comprises side guards 58 and front guard 60. The floating attachment of sealing head plate 30 to the floating mount 34 is accomplished by four spring connectors 62 operatively disposed between top plate 56 and sealing head plate 30, as shown in phantom in the views of FIGS. 1 and 2. Accordingly, when lever 42 is depressed, the sealing head means will move from a first, retracted position as shown in the views of FIGS. 1-3 to a second, engaged postion as shown in the fragmentary sectional view of FIG. 7. By virtue of the floating attachement of sealing head plate 30, the exposed knurled surface 32 will conform to the top surface 64 of the medication blister card being sealed.

Finally, in this preferred embodiment, the improved sealing apparatus 10 comprises means for heating the sealing head plate 30 comprising a pair of resistence heater rods 66 as shown in phantom in the view of FIG. 6. Apparatus 10 further comprises control means including on/off switch 68 and thermostat 70 operatively connected to heater rods 66 whereby the operation of the heating means may be regulated.

Turning to the views of FIGS. 4 and 5, it can be seen that card holder means 28 comprises a plate 72 including a first surface 74 and a bottom surface 76. Plate 72 further comprises a pair of ledges 78 for removably attaching card holder means 28 to carriage frame 16.

A plurality of first ridges 80 are formed substantially around the perimeter of top surface 74 of plate 72. A plurality of second ridges 82 similarly extend upwardly from first surface 74 and are placed in substantially surrounding relationship to each of the apertures 84 formed through plate 72. Card holder means 28 further comprises a pair of slug apertures 86 formed through plate 72 and a corresponding pair of card slugs 88 which are insertable into a corresponding one of the slug apertures 86. As also seen in the views of FIGS. 4 and 5, each of the card slugs 88 includes a blister aperture 90 formed therethrough. This preferred construction for cardholder means 28 permits the use of a single such means 28 with a wide variety of medication blister cards. Because card slugs 88 are removable and are diagonally opposed across top surface 74, one merely has to insert the appropriate pair of slugs 88 into plate 72 whereby blister apertures 90 will precisely match the size and configuration of the blisters on the medication blister card to be sealed. So long as those blisters will fit inside the remaining apertures 84, slugs 88 will ensure proper placement of the medication card for completion of the sealing operation.

Figure 7:
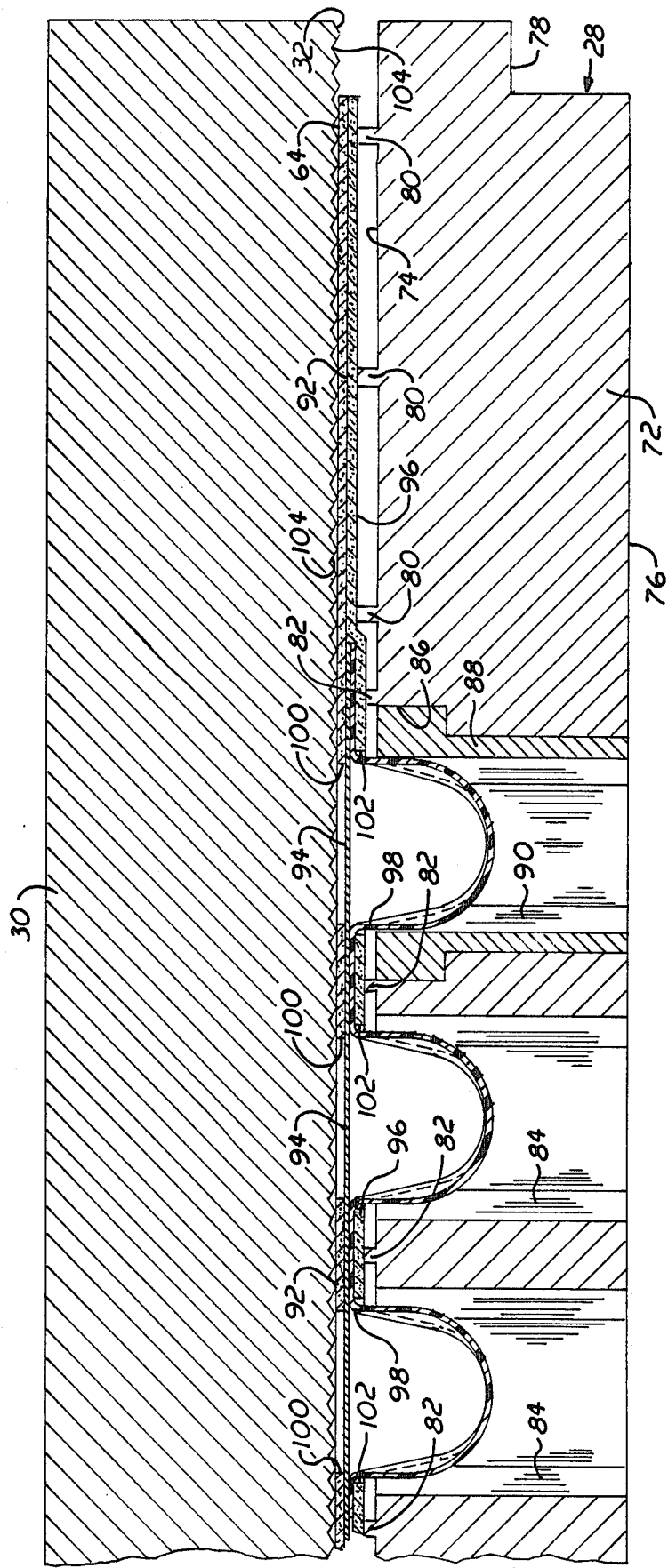
FIG. 7 is a sectional view taken along line 7—7 of FIG. 4 and illustrating structural details of the apparatus in use for sealing a medication blister card.

Attention is now invited to the detailed fragmentary sectional view of FIG. 7. In this view, it is to be understood that certain size relationships have been exaggerated for the sake of clarity. In similar fashion, the view of FIG. 7 depicts an exemplar medication blister card placed therein for sealing. It is to be understood that the scope of this invention is not to be limited by the particular form of medication blister card shown in the drawing figure. Nevertheless, for the sake of clarity in understanding this preferred embodiment of the improved sealing apparatus 10, it can be seen that this exemplar medication blister card comprises a first cardboard layer 92, a metallic foil sheet 94 attached to the first layer 92, a second cardboard layer 96, and a plastic blister insert 98 received by the second cardboard 96. Obviously, then, first cardboard layer 92 includes a plurality of first apertures 100 formed therethrough, and metallic foil sheet 94 provides a rupturable closure for each of the first apertures 100. In somewhat similar fashion, second cardboard layer 96 includes a plurality of second apertures 102 formed through it whereby plastic blister insert 98 may be received.

Structural details of the exposed knurled surface 32 of sealing head plate 30 may also be observed in the view of FIG. 7, knurled surface 32 is defined by a plurality of grooves 104 wherein each of the grooves 104 is substantially V-shaped in cross-section. According to this preferred embodiment, the sides of each of the grooves 104 define and angle of about 120°–170°, with the preferred angle being about 150°. Referring to the view of FIG. 6, it can be seen that each of the grooves 104 intersects at least one other of the grooves 104.

Referring back to the view of FIG. 7, even though the dimensions are somewhat exaggerated, it can now be seen quite clearly that the relative height of first ridges 80 is greater than the height of second ridges 82. This has been found to be necessary in order to provide a secure seal because of the added thickness of plastic blister insert 98 across a substantial portion of plate 72. It can also be seen that first ridges 80 and second ridges 82 maintain second cardboard layer 96 in a spaced apart relationship to first surface 74 of plate 72. This slight spacing has also proved to be of unique significance to the operability of sealing apparatus 10.

In actual use, the empty medication blister cards are normally stored in facilities having no humidity control. Accordingly, substantial quanties of moisture are absorbed from the air into first cardboard layer 92 and second cardboard layer 96. When the medication blister card is then filled and sealed, not only the pressure of the sealing means but also its heat will drive the moisture from cardboard layers 92 and 96 as water vapor. In prior art sealing devices, substantial quantities of this water vapor frequently condensed inside the plastic blister insert 98 thereby subjecting any medication contained therein to water. Obviously, that is not desirable. By virtue of the construction of the improved sealing apparatus 10 of this invention, virtually all of the water vapors condense outside the plastic blister insert 98 onto first surface 74 of plate 72. In actual operation of sealing apparatus 10, the formation of water drops on first surface 74 within the channels defined between first ridges 80 and second ridges 82 may be observed. Of course, because of the construction of sealing head plate 30 to define a knurled exposed surface 32, any water vapor forming above first cardboard layer 92 will normally vent to the atmosphere through grooves 104. Accordingly, by virtue of this construction of sealing apparatus 10, the presence of moisture within the medication-containing blisters of a sealed card is significantly reduced, if not virtually eliminated.

Yet another quite beneficial result is also provided by the sealing apparatus 10 of this invention. As water vapor condenses on first surface 74 of plate 72 and evaporates therefrom, there is an attendant cooling effect. That is to say, the channeled or directed water condensation onto first surface 74 has a significant cooling effect on plate 72 as well as on second cardboard layer 96 and plastic blister insert 98. Even under prolonged periods of substantially continuous use of sealing apparatus 10, plate 72 is sufficiently cooled so as virtually to eliminate any damage to plastic blister insert 98 which might easily be caused by retained heat from sealing head plate 30. This cooling effect has proven to be quite beneficial when gelatinous medication is being sealed within the medication blister card. In fact, it is not uncommon when using prior art devices under such circumstances to find that sufficient heat may actually be transferred to the medication so that it partially melts and adheres to the inside of the plastic blister insert 98. No such undesirable result has been observed when utilizing the improved sealing apparatus 10 of this invention.

Having thus set forth a prefrrred construction for the improved sealing apparatus 10, it is to be understood that the scope of the invention is not be be limited to this preferred embodiment. For example, it is certainly contemplated that the sealing apparatus 10 of this invention could be operated by means other than the lever-link-piston arrangment illustrated in the drawings. For example, an "automatic" embodiment of sealing apparatus 10 could be constructed wherein the operating means was pneumatic, hydraulic, or electro-mechanical. In similar fashion, and as previously stated above, the scope of this invention is also not to be limited by the construction of any particular medication blister card.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,

What is claimed is:

1. An improved sealing apparatus of the type primarily intended for use in sealing medication blister cards including a unit dose of medication in at least one of the blisters, said improved sealing apparatus comprising: a support frame; card carriage means movably mounted on said support frame; card holder means removably attachable to said carriage means, said card holder means being dimensioned and configured to receive a medication blister card thereon for sealing; sealing head means movably mounted on said support frame; means for heating said sealing head means operatively connected to said sealing head means; and operating means mounted on said support frame and operatively connected to said sealing head means whereby said sealing head means may be disposed in juxtaposition to the medication blister card to apply pressure and heat thereto for sealing the card; said card holder means comprising a first surface onto which the medication blister card is placed, said first surface comprising a plurality of first ridges extending away from said first surface and a plurality of second ridges also extending away from said first surface, wherein each of said first ridges is of a predetermined first height and wherein each of said second ridges is of a predetermined second height, said first height being greater than said second height; said sealing head means comprising a knurled surface formed thereon whereby said knurled surface will contact the medication blister card when said operating means is actuated.

2. An improved sealing apparatus as in claim 1 wherein each of said first and second ridges extends from said first surface in substantially perpendicular relation thereto.

3. An improved sealing apparatus as in claim 2 wherein said card holder means further comprises a plurality of apertures formed therethrough, each of said apertures being dimensioned to receive a blister of the medication blister card therein.

4. An improved sealing apparatus as in claim 3 wherein said card holder means further comprises a pair of slug apertures formed therethrough and a corresponding pair of card slugs, each one of said slugs being removably insertable into a corresponding one of said slug apertures, each of said slugs having a blister aperture formed therethrough, and each of said blister apertures corresponding to the dimension and configuration of a blister of a medication blister card, whereby medication blister cards of different blister sizes may be placed in said card holder means in proper relation to said sealing head means by changing said card slugs to correspond to the medication blister card to be sealed.

5. An improved sealing apparatus as in claim 3 wherein said first ridges are formed around the perimeter of said first surface and wherein said second ridges are formed around the perimeter of each of said apertures.

6. An improved sealing apparatus as in claim 1 wherein said sealing head means is movable between a first, retracted position and a second, engaged position with respect to an exposed surface of a medication blister card when the card is placed onto said first surface of said card holder means and said card carriage means is moved to align the card with said sealing head means.

7. An improved sealing apparatus as in claim 1 further comprising control means mounted on said support frame and operatively connected to said heating means whereby the operation of said heating means may be regulated.

8. An improved sealing apparatus as in claim 7 wherein said control means comprises a thermostat.

9. An improved sealing apparatus as in claim 1 wherein said first and second ridges are substantially rectangular in cross-section.

10. An improved sealing apparatus as in claim 1 wherein said knurled surface is defined by a plurality of grooves, each one of said grooves intersecting at least another one of said grooves.

11. An improved sealing apparatus as in claim 10 wherein each of said grooves is substantially v-shaped in cross-section.

12. An improved sealing apparatus as in claim 10 wherein the sides of each of said grooves define an angle of about 120°–170°.

13. An improved sealing apparatus as in claim 12 wherein said angle is about 150°.

14. An improved sealing apparatus as in claim 1 wherein said sealing head means further comprises a floating mount disposed in interconnecting relation between said knurled surface and said operating means whereby said knurled surface will conform to the plane of the medication blister card when said operating means is actuated.

* * * * *